Figures 1, 2:
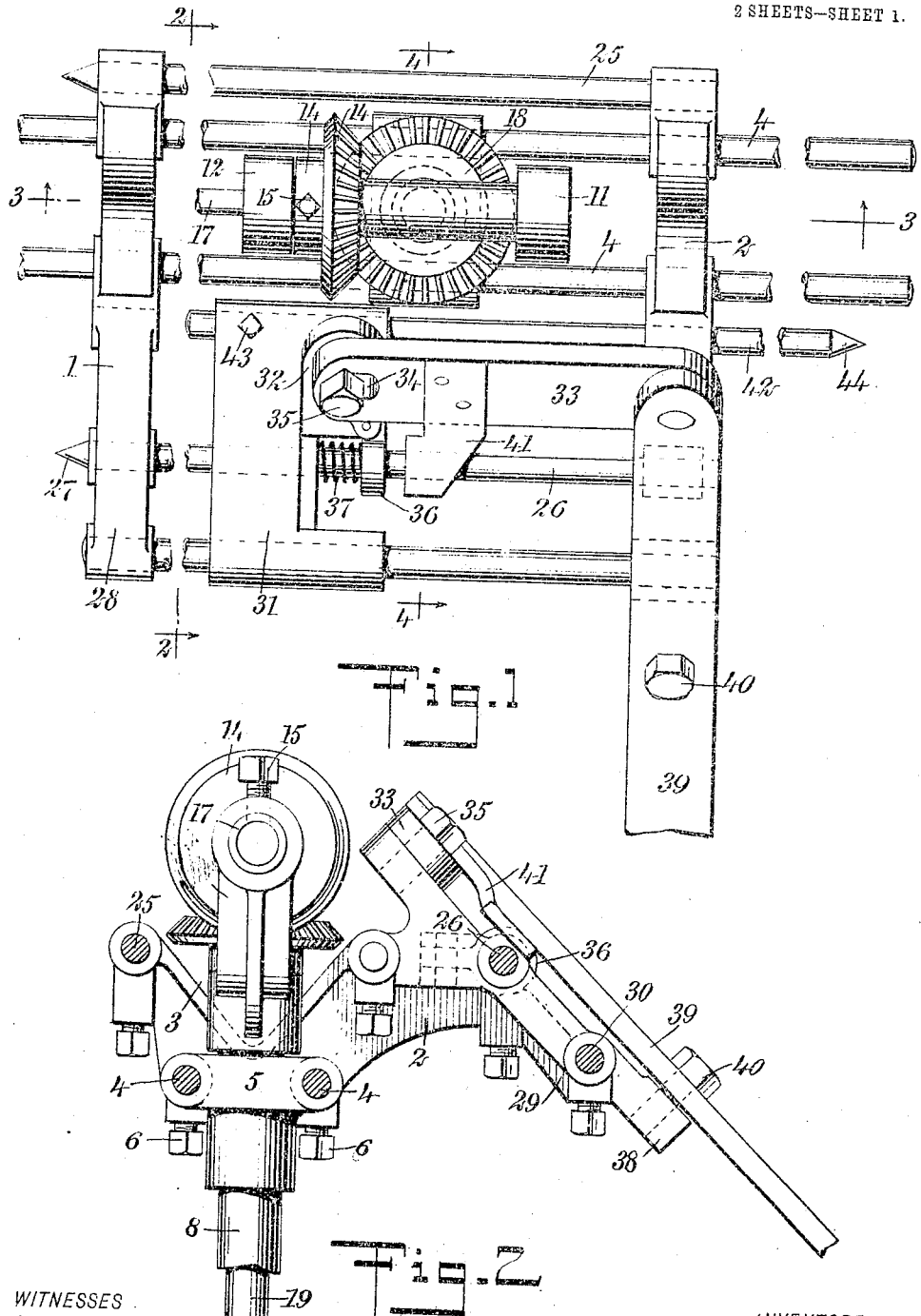

No. 873,724. PATENTED DEC. 17, 1907.
J. W. CONE & F. R. MILLER.
BORING DEVICE.
APPLICATION FILED FEB. 26, 1907.

2 SHEETS—SHEET 1.

WITNESSES
INVENTORS
John W. Cone
Forrest R. Miller
BY Munn & Co
ATTORNEYS

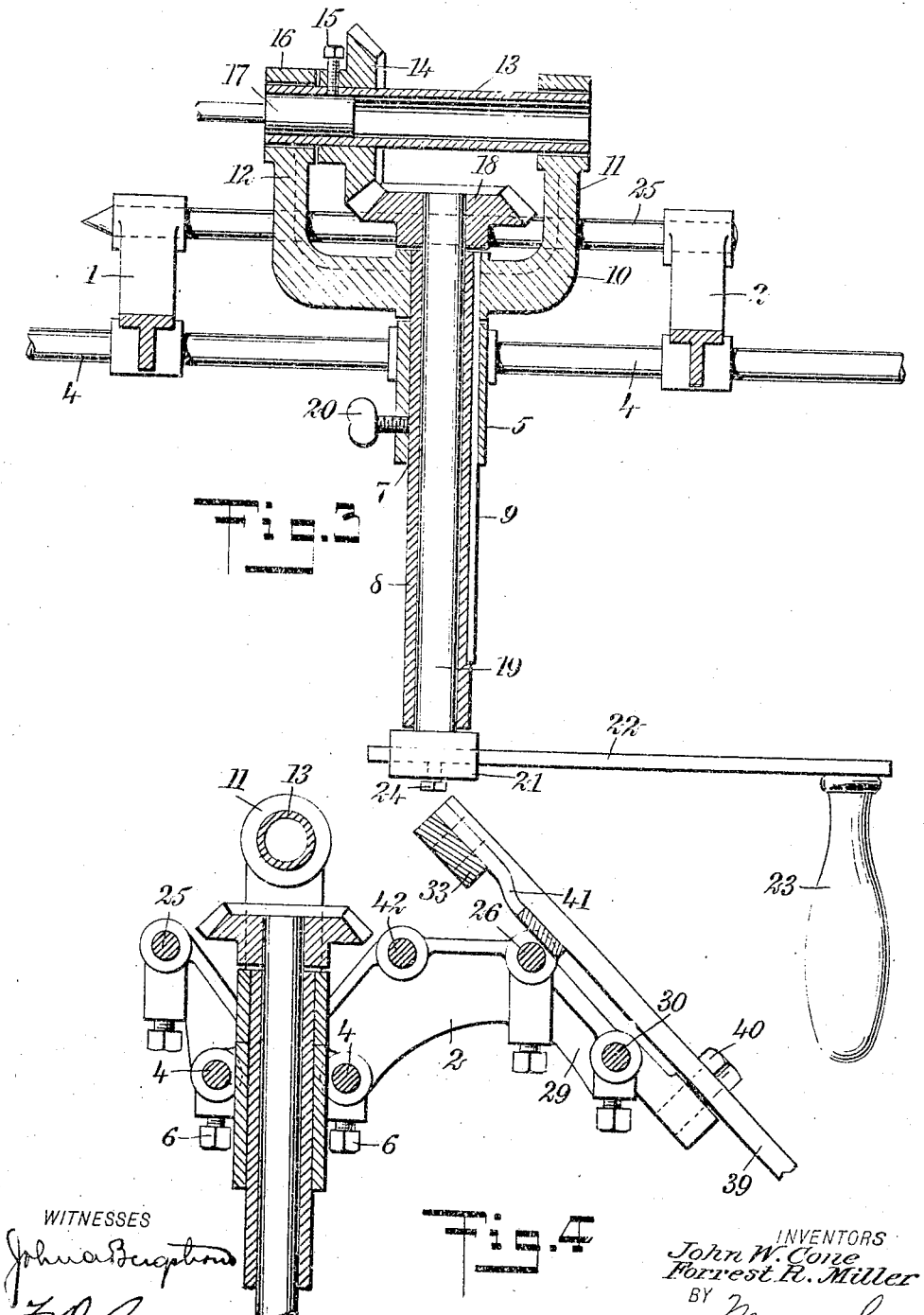

UNITED STATES PATENT OFFICE.

JOHN W. CONE AND FORREST R. MILLER, OF BARNESBORO, PENNSYLVANIA.

BORING DEVICE.

No. 873,724.  Specification of Letters Patent.  Patented Dec. 17, 1907.

Application filed February 26, 1907. Serial No. 359,443.

*To all whom it may concern:*

Be it known that we, JOHN W. CONE and FORREST R. MILLER, citizens of the United States, and residents of Barnesboro, in the county of Cambria and State of Pennsylvania, have invented a new and Improved Boring Device, of which the following is a full, clear, and exact description.

This invention relates to boring devices or machines, and the object of the invention is to produce a portable tool which is especially adapted for boring holes in the beams or rafters of floors.

More specifically, the object of the invention is to provide a device of this class with improved means for securing it in position preparatory to boring the hole.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a plan of the device, certain parts being broken away as indicated; Fig. 2 is a vertical cross section taken on the line 2—2 of Fig. 1, certain parts being broken away; Fig. 3 is a longitudinal section on the line 3—3 of Fig. 1; and Fig. 4 is a cross section on the line 4—4 of Fig. 1.

Referring more particularly to the parts, 1 and 2 represent end frames, the upper sides of which are formed into V-shaped notches or recesses 3 disposed opposite to each other, as indicated in Fig. 1. Near their lower portions these end frames are connected by parallel guide rods 4 which are adapted to slide freely through the end frames, as will be readily understood. On these guide rods between the end frames, a carriage 5 is rigidly attached by means of suitable set screws 6.
This carriage has the form of a hub, as shown in Fig. 3, said hub presenting a vertical bore 7 in which there is slidably mounted a sleeve 8. This sleeve is prevented from rotation in the carriage by means of a key 9 which extends longitudinally thereof, sliding in a key slot formed in the bore of the carriage. The upper portion of this sleeve carries rigidly a bracket 10 which presents upwardly projecting oppositely disposed forks 11 and 12. In these forks there is rotatably mounted a tubular chuck 13, and to this chuck there is rigidly attached a bevel gear 14, by means of a set screw 15; the said set screw passes through an opening 16 in the wall of the chuck so as to enable the set screw to attach a boring tool or bit 17 in the chuck. Meshing with the gear wheel 14 there is provided a corresponding bevel gear wheel 18, and this bevel gear wheel 18 is rigidly carried by a vertical spindle 19 which passes up through the sleeve 8, being loosely mounted therein, as will be readily understood. The entire sleeve 8 is adapted to be raised and lowered in the hub or carriage 5, and may be rigidly secured at any height desired by means of a thumb-screw 20 which is mounted in the side of the carriage, as indicated. The lower end of the spindle 19 is formed with a head 21 through which slides a crank 22, said crank being provided with a handle 23 for rotating the same. This crank 22 is adjustable in the head 21 by means of a suitable set screw 24.

In the upper portion of the end frames 1 and 2, I provide fixed clamping bars 25 and 26, and the ends of these bars extend through the end frame 1, and are provided with conical points 27, as shown. The end frames 1 and 2 are provided with inclined downward extensions 28 and 29, and between these extensions there is rigidly mounted a main guide bar 30. On the main guide bar 30 and the clamping rod 26 there is slidably mounted a cross head 31, and this cross head is formed at a suitable point with an inclined seat 32, at which point there is attached a link 33. The attachment at this point includes a slot 34 through which passes a bolt 35, said bolt being received in the seat 32, as indicated.

Pivotally attached to the cross head 31 near the seat 32, I provide a clutch collar 36 which is received over the clamping bar 26. Between this clutch collar 36 and the side face of the cross head, a helical spring 37 is provided around the clamping rod 26, as shown. The extension 29 of the end frame 2 is provided with an outwardly projecting ear 38, upon which there is pivotally attached a lever 39 by means of a suitable pivot bolt
40. This lever is disposed in an inclined position as shown in Fig. 1, and its upper end is pivotally attached to the aforesaid link 33. Adjacent to the clutch collar 36 a laterally projecting dog 41 is provided on the link 33, and this dog is adapted to engage the collar 36 when the link 33 is moved toward the left by the lever. In this connection it should be understood that the slot 34 is sufficiently long to enable the dog to strike the collar in the manner suggested. I provide a movable clamping bar 42 which slides freely through the end frame 2 and is rigidly attached to the cross head 31 by means of a suitable set bolt 43.

The mode of operation of the device will now be described: The boring bit or auger 17 having been mounted in the tool, the device is brought into position between the two beams where it is to be attached. It is then moved toward the left so as to engage the points 27 and the side face of the left-hand beam, and the lever 39 is then operated so as to move the cross head 31 toward the right; in doing so the clamping bar 42 slides toward the right, and its point 44 engages with the face of the right-hand beam. As the cross head advances, the collar 36 slides along on the clamping bar 26; but after the lever is released, this collar 36 locks the cross head against a rearward movement. This is effected by the pressure of the spring 37, as will be readily understood. The bracket 10 is then adjusted to the proper height, and the hole is bored in the beam. In this connection it should be understood that the carriage and the bars 4 advance freely as the hole is being bored, so that a proper feeding movement is given to the boring tool.

When it is desired to remove the device, the lever 39 is moved so as to move the link 33 toward the left. The first movement of this link does not impart any movement to the cross head 31, but simply brings about engagement of the dog 41 with the collar 36. This releases the cross head from the bar 26, and a further movement of the link then advances the cross head toward the left so as to disengage the point 44 from the right-hand beam. The V-shaped notches or depressions 3 in the end frames are intended to allow the forks 11 and 12 to pass when the carriage is sliding near the end frames, and in this connection attention is called to the fact that the key 9 holds the bracket 10 in proper alinement and prevents the bracket from rotating when the auger is being driven.

Having thus described our invention, we claim as new and desire to secure by Letters Patent:

1. In a device of the class described, in combination, end frames, a carriage, means for mounting said carriage to slide on said end frames, means for mounting a tool on said carriage, means for driving said tool, members carried by one of said end frames and adapted to engage the face of a beam, a clamping bar guided through the opposite end frame, a cross head carrying said clamping bar, a lever for advancing said cross head, means for locking said cross head against a return movement, and means for releasing said locking means by a reverse movement of said lever.

2. In a device of the class described, in combination, end frames, a carriage, means for mounting said carriage to slide between said end frames, means for mounting a tool on said carriage, means carried by one of said end frames for engaging the face of a beam, clamping bars slidably mounted in the opposite end frame, a cross head slidably mounted between said end frames and carrying said clamping bars, a lever having a slot connection with said cross head and adapted to advance said cross head to operate said clamping bars, a clutch carried by said cross head and affording means for locking said clamping bars when advanced, and means carried by said link for disengaging said clutch by a reverse movement of said lever.

3. In a device of the class described, in combination, a pair of end frames, a carriage, means for mounting said carriage to slide therebetween, means for mounting a tool in said carriage, means for driving said tool, clamping bars connecting said end frames and having points projecting beyond one of said end frames and adapted to engage the face of a beam, a cross head slidably mounted on one of said clamping bars, a movable clamping bar carried by said cross head sliding through one of said end frames, a clutch on said cross head engaging the clamping bar on which said cross head slides and affording means for locking said cross head when advanced, means for advancing said cross head, and means for disengaging said clutch by a reverse movement of said clamping means.

4. In a device of the class described, in combination, an end frame, a second end frame, guide bars slidably mounted through said end frames, a carriage rigidly attached to said guide bars, means for mounting a tool in said carriage, means for driving said tool, a clamping bar connecting said end frames and having a point projecting beyond said first end frame, a second clamping bar connecting said end frames and having a point projecting beyond said first end frame, a guide bar adjacent to said second clamping bar, a cross head slidably mounted on said last guide bar and said second clamping bar, a movable clamping bar rigidly attached to said cross head and slidably mounted through said second end frame, a clutch carried by said cross head and coöperating with said second clamping bar to clamp said cross head after advancement, a link having a slot connection with said cross head, a lever mounted on said second end frame and connected with said link to advance said cross head, and a dog carried by said link and adapted to engage said clutch to release the same by a reverse movement of said lever.

5. In a device of the class described, in combination, end frames, guide bars slidably mounted therethrough, a carriage rigidly attached to said guide bars and presenting a hub, a sleeve slidably mounted in said hub, means for locking said sleeve in said hub against rotation, means for adjusting said sleeve in said hub, a bracket carried rigidly by said sleeve, and means for supporting a tool in said bracket.

6. In a device of the class described, in combination, end frames, guide bars slidably mounted therethrough, a carriage rigidly attached to said guide bars and presenting a hub, a sleeve slidably mounted in said hub, means for locking said sleeve in said hub against rotation, means for adjusting said sleeve in said hub, a bracket carried rigidly by said sleeve, means for supporting a tool in said bracket, a spindle passing upwardly through said sleeve, a chuck mounted in said bracket, and means for driving said chuck from said spindle.

In testimony whereof we have signed our names to this specification in the presence of two subscribing witnesses.

JOHN W. CONE.
FORREST R. MILLER.

Witnesses:
SAMUEL D. THOMAS,
H. R. SMITH.